(12) United States Patent
Shetye

(10) Patent No.: US 10,152,605 B2
(45) Date of Patent: Dec. 11, 2018

(54) SYSTEMS AND METHODS FOR FRONT-END AND BACK-END DATA SECURITY PROTOCOLS

(71) Applicant: Siddharth Shetye, San Diego, CA (US)

(72) Inventor: Siddharth Shetye, San Diego, CA (US)

(*) Notice: Subject to any disclaimer, the term of this patent is extended or adjusted under 35 U.S.C. 154(b) by 0 days.

(21) Appl. No.: 14/719,306

(22) Filed: May 21, 2015

(65) Prior Publication Data

US 2015/0339486 A1 Nov. 26, 2015

Related U.S. Application Data

(60) Provisional application No. 62/001,151, filed on May 21, 2014.

(51) Int. Cl.
*H04L 29/06* (2006.01)
*H04L 29/08* (2006.01)
*G06F 21/62* (2013.01)
*H04L 9/32* (2006.01)
*G06F 21/46* (2013.01)

(52) U.S. Cl.
CPC .......... *G06F 21/6218* (2013.01); *G06F 21/46* (2013.01); *H04L 9/3231* (2013.01); *H04L 9/3271* (2013.01); *H04L 67/02* (2013.01); *H04L 67/10* (2013.01); *H04L 67/12* (2013.01);
(Continued)

(58) Field of Classification Search
CPC ......... H04L 67/02; H04L 67/42; H04L 67/22; H04L 67/12; H04L 67/10; H04L 69/16; H04L 9/3231; H04L 9/3271; H04L 29/06; H04L 63/145; H04L 63/08; G06F 21/6218; G06F 21/46; G06F 21/62
See application file for complete search history.

(56) References Cited

U.S. PATENT DOCUMENTS 6,163,776 A * 12/2000 Periwal ............ G06F 17/30607
8,261,068 B1 * 9/2012 Raizen ................ G06F 21/6218
713/164
(Continued)

OTHER PUBLICATIONS

Morein, et a., "Using Graphic Turing Tests to Counter Automated DDoS Attacks Against Web Servers", Oct. 27-30, 2003, CCS'03 Proceedings of the 10th ACM conference on Computer and communications security, pp. 8-19.*
(Continued)

*Primary Examiner* — Nelson Giddins
(74) *Attorney, Agent, or Firm* — Procopio, Cory, Hargreaves & Savitch LLP

(57) ABSTRACT

A security framework and methodology is provided which provides front-end security through authentication and authorization, and back-end security through a virtual private data-store created within an insecure environment using existing object-relational mapping (ORM) layers or database drivers. The front-end security utilizes numerous multi-factor authentication metrics and a distributed denial of service (DDoS) cryptographic boundary to proactively attack malicious users using a cryptographic puzzle, and the back-end security provides data encryption and decryption, data privacy, data integrity, key management, pattern monitoring, audit trails and security alerts while simultaneously hiding the complexity behind an identical or similar ORM or database drive application programming interface (API).

15 Claims, 8 Drawing Sheets

(52) U.S. Cl.
CPC .............. *H04L 67/22* (2013.01); *H04L 67/42* (2013.01); *H04L 69/16* (2013.01)

(56) References Cited

U.S. PATENT DOCUMENTS

| | | | | |
|---|---|---|---|---|
| 8,291,500 | B1* | 10/2012 | Bojaxhi | H04L 63/145 713/188 |
| 8,838,654 | B1* | 9/2014 | Hannah | G06F 17/30294 707/803 |
| 8,892,875 | B1* | 11/2014 | Baldwin | H04L 9/0891 713/165 |
| 9,411,948 | B1* | 8/2016 | Suresh | H04L 63/0838 |
| 9,507,820 | B1* | 11/2016 | Hannah | G06F 17/30292 |
| 2004/0153435 | A1* | 8/2004 | Gudbjartsson | G06F 17/30595 |
| 2005/0210258 | A1* | 9/2005 | Birrell | H04L 12/585 713/178 |
| 2006/0036448 | A1* | 2/2006 | Haynie | G06Q 10/10 705/37 |
| 2006/0195476 | A1* | 8/2006 | Nori | G06F 17/30569 |
| 2007/0219976 | A1* | 9/2007 | Muralidhar | G06F 17/30017 |
| 2009/0259612 | A1* | 10/2009 | Hanson | H04L 69/22 706/47 |
| 2010/0031315 | A1* | 2/2010 | Feng | G06F 21/554 726/3 |
| 2010/0095351 | A1* | 4/2010 | Liu | H04L 63/1416 726/3 |
| 2011/0154215 | A1* | 6/2011 | Raley | G06F 21/10 715/744 |
| 2011/0209196 | A1* | 8/2011 | Kennedy | G06F 21/55 726/1 |
| 2011/0231913 | A1* | 9/2011 | Feng | G06F 21/46 726/7 |
| 2011/0270857 | A1* | 11/2011 | Bommireddipalli | G06F 17/30306 707/758 |
| 2012/0174196 | A1* | 7/2012 | Bhogavilli | H04L 63/1458 726/5 |
| 2012/0260329 | A1* | 10/2012 | Suffling | H04L 63/104 726/9 |
| 2012/0265984 | A1* | 10/2012 | Ramanujan | H04L 9/0847 713/156 |
| 2013/0013912 | A1* | 1/2013 | Rung | H04N 21/2347 713/150 |
| 2013/0066948 | A1* | 3/2013 | Colrain | H04L 67/146 709/203 |
| 2013/0138721 | A1* | 5/2013 | O'Connell | G06Q 40/06 709/203 |
| 2013/0219176 | A1* | 8/2013 | Akella | H04L 63/0815 713/165 |
| 2013/0297654 | A1* | 11/2013 | Khimich | G06F 21/6218 707/783 |
| 2014/0007238 | A1* | 1/2014 | Magee | G06F 21/577 726/24 |
| 2014/0157370 | A1* | 6/2014 | Plattner | G06F 21/6245 726/4 |
| 2014/0365775 | A1* | 12/2014 | Yavuz | H04L 63/061 713/171 |
| 2015/0058977 | A1* | 2/2015 | Thompson | H04L 63/1416 726/22 |
| 2015/0082399 | A1* | 3/2015 | Wu | G06F 21/6209 726/6 |
| 2015/0142919 | A1* | 5/2015 | Lee | H04L 67/2814 709/219 |
| 2015/0189034 | A1* | 7/2015 | Kelkar | H04L 67/42 709/203 |
| 2015/0317490 | A1* | 11/2015 | Carey | G06F 19/28 726/26 |
| 2016/0173527 | A1* | 6/2016 | Kasman | H04L 63/1458 726/23 |
| 2016/0261581 | A1* | 9/2016 | Wang | H04L 63/0272 |
| 2016/0330031 | A1* | 11/2016 | Drego | H04L 9/3239 |
| 2017/0068826 | A1* | 3/2017 | Dimitrova | G06F 19/28 |

OTHER PUBLICATIONS

Juels, et al., "Client Puzzles: A cryptographic Countermeasure Against Connection Depletion Attacks", Jan. 1999, Juels, et al., Client Puzzles: A cryptographic Countermeasure Against Connection Depletion Attacks.*

* cited by examiner

SYSTEMS AND METHODS FOR FRONT-END AND BACK-END DATA SECURITY PROTOCOLS

BACKGROUND

Field of the Invention

Systems and methods provided herein relate to a computer application security framework which provides front-end and back-end security, and more specifically to front-end security using multi-factor authentication and DDoS mitigation, and back-end security through a virtual private data-store using existing object-relational mapping (ORM) layers or database drivers.

Related Art

As cloud computing flourishes, organizations and individuals are putting more of their sensitive data and applications within datacenters, servers and the 'cloud'. This trend elevates the risk of accidental or intentional data or security breaches that may negatively impact society, organizations or individuals. Security can be viewed as front-end security and back-end security. Traditional back-end security solutions (databases, filers etc.) are insecure within the cloud computing paradigm and traditional front end security offers only basic levels of user verification (e.g.: password or more recently, 2-factor authentication).

Traditional back-end security systems were designed in an era when usage of computer resources (e.g.: servers, databases, storage etc.) usually implied ownership and control of such resources by the entity using them. Such assumptions are baked right into the heart of existing security systems. These assumptions are broken in the cloud computing paradigm, where such resources are owned by an independent entity but are only rented/leased by the application owner/user/organization. This in turn breaks down the security of traditional systems relying on such assumptions.

For example, in a traditional SQL database server, the server not only stores the encrypted data but it also stores or receives the encryption keys. In the cloud computing paradigm, this severely undermines the security of the system because a 3rd party is involved in the administrative functions of such a server, meaning such a 3rd party can easily access the sensitive data or keys while performing their administrative duties.

For front end user security, the current techniques utilize passwords or PINs along with a secure-token usually in the form of a dedicated hardware dongle or as a software application that displays an alpha-numeric value. Front end authentication systems relying on passwords are weak because humans generally choose poor passwords (password that are easy for a computer to guess). Two-factor authentication systems help but don't go all the way; leaving many other relevant and useful factors unused. Because of this, the security is weaker than what is possible.

Therefore, it is desirable to develop a system framework which secures application data on a front-end and back-end.

SUMMARY

Embodiments described herein provide for systems and methods for a computer application security framework which provides front-end security through authentication and a cryptographic boundary, and back-end security through a virtual private data-store created within an insecure environment using existing object-relational mapping (ORM) layers or database drivers. The front-end security utilizes numerous multi-factor authentication metrics and a distributed denial of service (DDoS) cryptographic puzzle to proactively challenge malicious users, while the back-end security provides data encryption and decryption, data privacy, data integrity, key management, pattern monitoring, audit trails and security alerts while simultaneously hiding the complexity behind an identical or similar ORM or database driver application programming interface (API).

In one embodiment, a system for securing application data comprises: a multifactor authentication (MFA) server performing a plurality of user and client authentications; a distributed denial of service (DDoS) protection server sending cryptographic puzzles to requesting clients; and an application server hosting a virtual private data-store for application data, wherein the application server comprises: a data security module (DSM) which routes all data flowing into and out of the application, wherein the DSM operates under an objection relational mapping (ORM) layer; and a DSM-ORM adaptor which routes and maps data flowing from the DSM to the ORM.

In another embodiment, a computer implemented method for securing application data is provided, where one or more processors are programmed to perform steps comprising: performing a plurality of multifactor authentication (MFA) tests on a user and client requesting access to an application; performing a cryptographic puzzle test on the user and client requesting access to the application; and routing and processing requested data from the user and client through a data security module (DSM) operating under an objection relational mapping (ORM) layer via a DSM-ORM adaptor on an application server.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Certain embodiments disclosed herein provide for a computer application security framework and methodology providing front-end security through authentication and authorization, and back-end security through a virtual private data-store created within an insecure environment using existing object-relational mapping (ORM) layers or database drivers. The front-end security utilizes numerous multi-factor authentication metrics and a distributed denial of service (DDoS) cryptographic boundary to proactively attack malicious users using a cryptographic puzzle, while the back-end security provides data encryption and decryption, data privacy, data integrity, key management, pattern monitoring, audit trails and security alerts hidden behind an identical or similar ORM or database driver application programming interface (API).

The inventive features described herein protect the application at both sides where it's vulnerable. Front end security comes from multi-factor authentication and DDoS mitigation, while back-end security comes from cryptographically carving out private data-stores within a public/unprotected data-store, which is automatically managed by a scalable key management solution.

The claimed invention differs from what currently exists and is an improvement on what currently exists. For back end database security, previous designs trust the database or file servers and allow them to receive unencrypted data as well as encryption keys. Several of these security weaknesses exist because previous architectures made several assumptions about the security perimeter and resource ownership—assumptions which do not hold true in a cloud computing paradigm. Unlike traditional database designs, the enclosed embodiments make no assumptions on physical proximity, resource ownership, resource administration and resource consumption, thereby creating a fundamentally different system that decouples "trust" from "storage" and "trust" from "access." Instead, the application processes unencrypted data, yet the database and/or file servers only see encrypted data.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

I. System Framework

Figure 1:
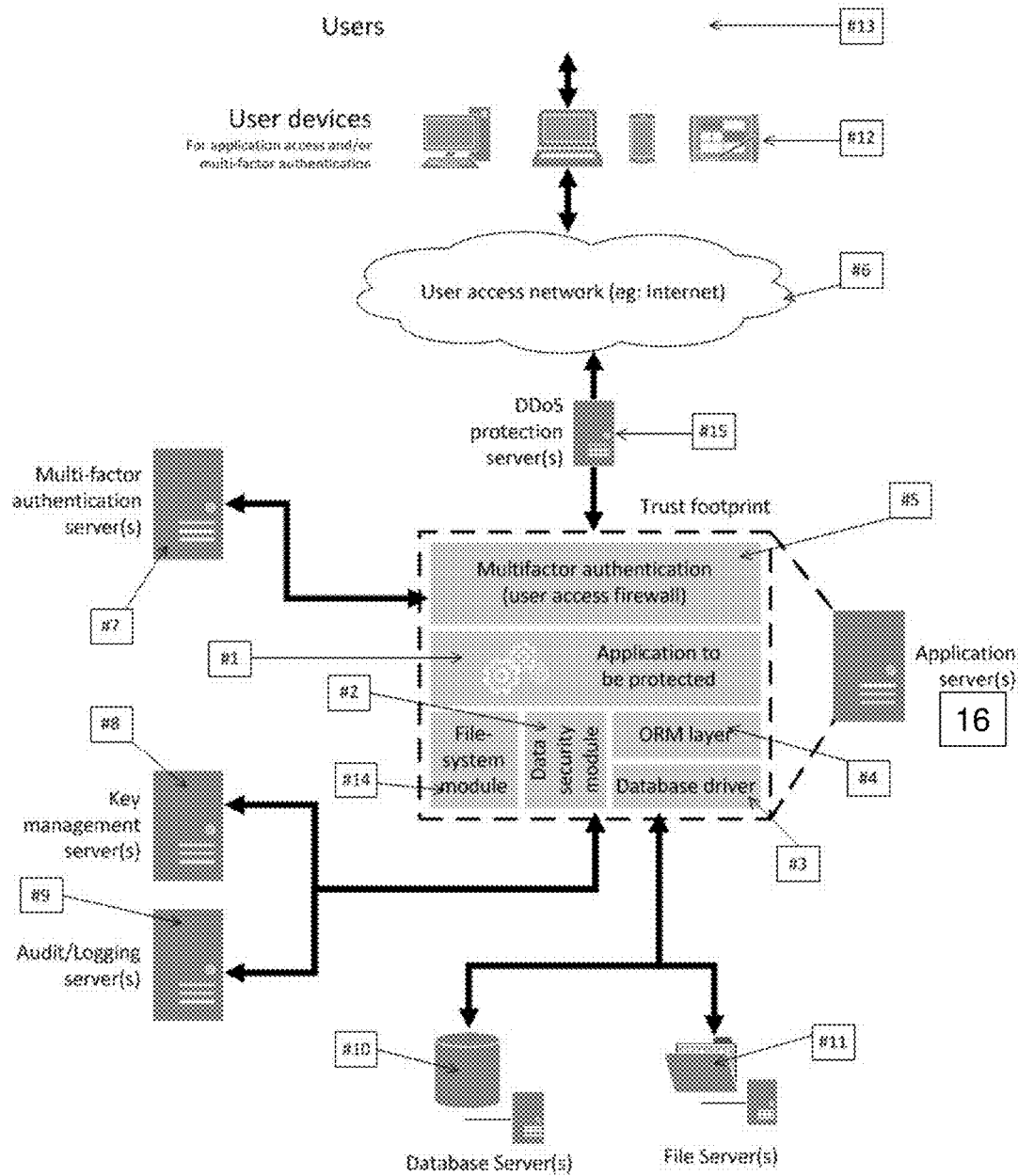
FIG. 1 is a network diagram illustrating an example system framework for front-end and back-end computer application security, according to an embodiment of the invention.

One embodiment of a system framework for front-end and back-end application security is illustrated in FIG. 1. Users (13) use a user device (12) that connects over a user access network (6) such as the internet, through the DDoS protection server(s) (15), to use an application (1). Access to the application is protected by the multi-factor authentication module (5), which may or may not require the presence of an optional multi-factor authentication server (7) to authenticate the clients' various factors (like location, time, biometrics etc.—see Section II, below). Application access is also protected by the DDoS protection server(s) (15), which intelligently and proactively combat DDoS attacks.

The application (1) uses data, as it desires, from either the database servers (10) or the file servers (11), and this data is processed by the data security module (2) (DSM).

The DSM (2) may or may not use key management server(s) (8) or audit/logging server(s) (9). The audit and logging servers (9) receive events from the data security module (2) or the key management server (8). These events are a record of various operational actions performed, and are stored in a write-once manner (to make the log events immutable to avoid tampering before an audit). The audit and logging servers (9) also automatically review such events to detect anomalous activities and then alert administrators. It is also possible to embed the functionality of the key management server as well as the audit/log server into the data security module itself.

In one embodiment, a cyber-appliance may be created (physical or virtual) that completely encapsulates the functionality of the security framework within a single manageable unit. An example would be where the above functionality is incorporated on a computing platform entirely enclosed in a physical case with just a power cable or power switch and a network interface for a plug and play "appliance." Another example would be where the above functionality is implemented in software on a virtual machine (VM) or a collection of VMs which can then simply be turned on for the creation of a plug-and-play virtual "appliance." Additionally, the embodiments described herein can also be used to protect live or streaming data by using a similar technique of re-directing data into the data security module.

It is important to note that while it is advantageous to have both the front end and back end security modules functioning together, they work independently, such that each does not mandate the presence of the other.

II. Front-End Security

In one embodiment, front-end security includes the use of multi-factor authentication (MFA) and DDoS mitigation, working independently to ensure proper access to the application.

a. Multi-Factor Authentication

The front end multi-factor authentication (MFA) system includes the MFA client (12)—such as a mobile computing device—and the MFA server(s) (5). The user registers their user device via a secure registration process. This registration process associates or cryptographically binds the user device(s) with the identity of the user, and this unique binding is recorded by the MFA server (5). In practice such binding is easiest to perform by sharing cryptographically unique random bytes ('seed) across the MFA server as well as the user device. Another option is the issuance of public key certificates at time of registration.

After registration, and for every authentication request, the user uses their registered device(s). Unlike traditional MFA solutions, the system can be configured or customized for not only different numbers of authentication factors, but also for different orders of authentication factors, such that the system shuffles the order in which the different authentication and authorization factors are presented to the user. This configuration can be static or dynamic as determined by additional internal or external influences. Such influences could include, but are not limited to, user(s) or user-device(s) past behavior, location, settings, resources being accessed, and signals from an ongoing, expected or past cyber or physical attack, health of local or overall system(s), and so on.

The embodiments described herein account for additional factors like biometrics, geo-location, timing, gestures, etc. on the mobile device as the entity is attempting to access the protected resource. Some of the factors the system includes for additional security when performing authentication and authorization are:

- The physical/biometric identity of the user (including but not limited to photographs, live camera videos, fingerprints etc.).
- Biometric data indicating that the identified user is also alive (via heart rate of the user, tracking on-screen guidance in real time, tracking usage of the application and device itself. For example, the system might track a user's eyeballs to see if their eyes follow their fingers when entering "9-9-7-3" on the screen. Another example would be tracking their eyes to see if the user's eyes followed the last action performed by the user. In both examples, user interface elements can be displayed at different positions or in different layouts so a user must always inspect the display when interacting—allowing the system to take measurements of attentiveness or liveliness.
- Secret actions or gestures known only to users. For example, a user could "air write" the secret number sequence "9-9-7-3" when holding the mobile device as a spray painting can. Another example would be rotating the phone in a pattern like "9 o'clock clockwise, 2 o'clock anticlockwise, 10 o'clock clockwise and 7 o'clock anti-clockwise" like a rotary combination lock often seen on safes or gym lockers. The device's gyroscopes and accelerometers could be used for detecting such secret patterns.
- Current and previous geo-locations, including absolute locations as well as relative locations or proximities (to entrances, servers or other objects).
- Date as well as time of the user at the instant of access to check authorization of an authenticated user. For example, a technician authenticating himself at the gates of a nuclear power station outside of his authorized and scheduled service timeframe would be denied access at the gates.
- Current and previous behavior of the user—as well as user's device(s)—to detect anomalous activities or intentions. For example, if a user who historically used only one area of an application now suddenly attempts to access newer areas, or if the user's typing pattern is substantially different from before, or if the camera detects the current user looking away or leaving, or if the camera detects another face examining the display, the system can immediately un-authenticate the user.
- Adaptive factors, where authentication and authorization may start with few or no checks to simplify access. Later however, when our system detects anomalous behavior (such as that described immediately above), and/or if the user continues to access of the protected resource (for example, every 10 minutes inside the server room), the system can present additional factors to escalate the user's authentication process for security reassurance. Such factors could be any of the above or even those not listed above (e.g. call to supervisor). In addition, the system could also make a determination that the access be instantly revoked.
- Environmental sounds around the user as well as user's device(s). For example, historically the acoustic energy spectrum in a server room may match fan noise from the server(s), but the user's device exhibits a different acoustic spectrum. Another example would be where a user may be asked to repeat an on-display sentence and their voice or vocal characteristics are analyzed to determine if they are different.

b. MFA Example

One example of multi-factor authentication using the embodied system is provided immediately below, although one of skill in the art will appreciate that this is only one such permutation of many possible combinations and scenarios.

In this example, the user is first presented with a username-password (or PIN). Simultaneously, the MFA client activates it's sensors to capture ambient data. The user entered PIN on the client is verified by the server, typically against their existing organizational credentials (e.g. Windows Domain password). After confirming the password or PIN, the user sees a 6-12 digit alphanumeric time-varying one-time password (TOTP). This TOTP is generated off the unique shared seed data created during registration and therefore cryptographically binds the user identity to the specific registered user device. Other than the MFA server and the user device, no other device has the shared seed data, and therefore no other device can recreate or impersonate the TOTP. Once the MFA server receives the TOTP and verifies that TOTP with its own regenerated value, the next factor is verification of the user location via one or more location sensors.

The next factor is the time of access of the resource by the user. Time of access is an authorization function that can, for example, instantly unauthenticate an otherwise authenticated maintenance worker attempting to access a system outside their scheduled hours. Both of these factors are captured by the local sensors and verified by the MFA server. If this is successful, the last factor is the biometric factor as well as understanding if the user is alive. This can be done via the camera sensors (eye scans, facial recognition) as well as challenging the user for physical responses like vocalization, eyeball movements or gestures.

After clearing all the MFA stages, user or agent(s) are granted access. An important point about each factor is that they are all cryptographically tied to a specific authentication session to thwart against replay attacks or mix-and-matching responses from various sessions. For example, in order to prevent a malicious client from replaying a successfully PIN response from a session from last week and replaying a successful biometric response from today to pass off as two passing factors from a single current session, the protocol on both the client and server progressively and cryptographically mixes the request and response messages that flow between the clients and the server. This ensures that every factor cleared or passed by the user builds upon the factor immediately preceding it and all belong to the same session.

c. Cryptographic Filters

Another feature of front end traffic security is an application layer crypto-filter. For front end traffic security against distributed denial of service (DDoS) attacks, the current publicly available techniques identify malicious traffic by identifying excessively high volumes of traffic or by deep packed inspection for signatures of malicious traffic. The inventive system addresses the cases where malicious traffic is neither excessively high or where it does not have existing signatures to match against. In this embodiment, the system presents a cryptographic puzzle to every requestor. Such a requestor must then expend energy and computational power to solve the crypto puzzle.

The system is also very flexible where already authenticated requests (e.g. a user who has already signed in) can be given simple or no crypto puzzles while unauthenticated or high volume flows can be given increasingly difficult crypto puzzles. In addition, more expensive requests (e.g. requests to search an entire database) can be asked to solve harder crypto puzzles, while cheap requests (e.g. fetching a small, static HTML file) can be asked to solve simple or no crypto puzzles. This forces every suspected requester to spend energy and computational power in order to access the resource being protected, which in turn reduces the intensity of a DDoS attack.

Another key aspect of the system is that a server or node protecting the protected resource can exponentially increase the expenditure of energy and computational power of an attacker with no additional burden on itself.

For DDoS protection, the crypto puzzle can either be stated in full or have just its minimal parameters transmitted. The crypto puzzle can be sent either at the TCP layer or the HTTP layer or the application layer. At the TCP layer, the puzzle parameters are encoded inside the TCP header sequence number field. For HTTP, the crypto puzzles are encoded either in HTTP headers or as HTTP cookies. At the application layer, the crypto-puzzle challenge response can be encoded within the application protocol in a myriad of ways. One such example is a JSON representation of the crypto-puzzle challenge response in the headers of the application protocol.

In one embodiment, the DDoS protection server (15) examines every HTTP or TCP request for the presence of a crypto-puzzle solution. For TCP, the parameters of the crypto-puzzle (either the challenge or the response) are encoded for transport between client and servers within the TCP Sequence number field, whereas for HTTP the crypto puzzle can either be inside the HTTP headers or inside an HTTP cookie itself. Here, the system is described using HTTP cookies as an example, but the same principles govern TCP as well as HTTP-Headers too.

When a server sees an HTTP request that's missing the crypto puzzle response, it responds back with an HTTP error code (E.g.: 402, 403 or 404 etc.) and also presents the client the crypto puzzle challenge. This crypto puzzle challenge can cover several items, for example, the resource to be protected (e.g. URI), a random nonce, strength of the puzzle, the version of the puzzle specification, etc.

Another key innovation is that the instead of the server keeping track of many crypto-puzzles in-flight (which can itself lead to DDoS), the server simply maintains a single secret key which it uses to create and add an HMAC to the crypto-puzzle challenge. This enables the server to use the network and clients to store state of the crypto puzzle. It also prevents the clients from modifying the crypto puzzle since any changes (e.g. reducing the intensity of the puzzle) will invalidate the associated HMAC. To account for the latencies and security, the server continuously refreshes its HMAC key but also keeps 1-2 previous keys for clients who might respond late. A legitimate client seeing the crypto puzzle can solve it and add the crypto-puzzle response in subsequent requests. The server can then reduce or eliminate the difficulty or intensity of the crypto puzzle for clients behaving normally. A malicious client is also forced to solve the crypto puzzle, which limits the attack rate of such a client.

In addition, the server can trivially escalate the difficulty of the crypto puzzle to make it exponentially difficult for the client without incurring any additional expense of server resources in verifying such puzzles. This asymmetry of resource expenditure is the key innovation which levels the playing field when outnumbered by attackers. Without a valid crypto puzzle response or with a missing crypto puzzle response (e.g. in traffic flood attack), the client cannot reach the protected resource (e.g. a login page) to cause the DDoS. If such a now-left-out malicious client returns to primitive traffic flood attacks, solutions already exist to take care of such circumstances. It is vital to note that all of the above protection can take place either inside a dedicated module, depicted as the DDoS protection server(s) (15), or embedded in the application (1) itself.

d. Cryptographic Filter Examples

To demonstrate how a defending server can force an attacker to expend exponentially rising energy and computational power, an example crypto puzzle is defined. The chosen puzzle could be a pipe (|) separated string of parameters like:

puzzle version|protected resource|nonce|workfactor|signature where:

Puzzle version: A symbol that allows for schematic changes in a system's crypto puzzles over the lifetime of the system. This can be just a number like 1 or 2 and so on. So for example, 1 might indicate a system based on SHA256 and HMAC-SHA256, 2 may indicate SHA512 and HMAC-SHA512, 3 might indicate a crypto puzzle schema or suite based on elliptic curves and so on.

Protected resource: This can be the resource URL or IP address or any other form of representation of the resource (e.g. a hash of the URL, along with certain HTTP headers and body).

Nonce: This is just a random string or number to avoid replay attacks.

Workfactor: This is an integer that indicates the difficulty of a particular crypto puzzle. A low number indicates a "good" client getting easy to solve crypto puzzles while a higher number indicates a "suspicious" (to server) or "bad" client receiving hard to solve crypto puzzles. The server or a supporting piece of infrastructure (like a load balancer or firewall) may choose a level of difficulty based on a number of factors like black listed IP addresses, current network load, current server load, traffic patterns, suspicious traffic or access patterns, resource being accessed, state and/or resources of requestor etc. These factors by themselves are easy to access for anyone skilled in the art and so are outside the scope of this application.

Signature: This is a cryptographic signature generated by the defending server that's a part of the crypto puzzle. This allows for the defending server to create unique crypto-puzzled for every request and store these crypto puzzle in the network and on the clients instead of its own memory or cache. This conserves the resources on the server. Specifically, the signature ensures that crypto puzzles cannot be altered by anyone, so when the puzzle and its solution are inspected for verification, the integrity of each and every crypto puzzle is maintained. An example of a signature system would be an HMAC-SHA256 that uses a 256 bit key that is randomly generated every 2 minutes by the server issuing the crypto puzzles. A crypto-puzzle verifying server would then only need to keep this key and its previous version (total of just 512 bits) in its memory but can now securely verify every puzzle on every request over a span of time that can be considered reasonable with complete assurance of every puzzle's integrity. The defending server needs to keep the previous version of the HMAC key so it can reliably verify crypto puzzles sent out just prior to the HMAC key rotation. Additional older versions of the HMAC key can be cached to assist in verification of older crypto puzzles dispatched. It's important to note that one can replace the specific signature algorithm here by any other signature algorithm (e.g. 256 bit elliptic curves); we have used HMAC-SHA256 just as one illustrative example.

The above crypto-puzzle can be sent by the defending server as an HTTP header string.

Having defined an example crypto-puzzle, its corresponding crypto-puzzle example solution is defined as the original puzzle with an additional parameter at the end, for example:

puzzle version|protected resource|nonce|workfactor|signature|int64 where int64 is a 64 bit signed integer, and all other parameters are as before. The above crypto-puzzle solution must be sent by any client as an HTTP header string.

Lastly, to fully define the example crypto puzzle, we need to define when a client proposed solution is considered a successful one. In our illustrative example, we can consider a successfully solution when the SHA256 of the proposed solution string has at least "workfactor" number of binary zeros starting from its least significant bit. Anything else is considered a failure as is the absence of a crypto-puzzle in the clients' response.

To complete this illustrative example, we look at three crypto-puzzles, their workfactors and its impact on the client making the request. We assume puzzle version is 1 and the resource is the URL represented by the string https://www.example.com/login.

Case 1: Good Client, Workfactor 8

Puzzle sent by defending server:

1|https://www.example.com/login|C7AEB757744CDDF6C55609C30452C86E4D7399DBC933E547036EA9112C96DDD1|8|6EE477FE8558C37424 9E58CA61987F4F8860C-0058784025B15B6953CBD0F400B Solution sent by client:

1|https://www.example.com/login|C7AEB757744CDDF6C55609C30452C86E4D7399DBC933E547036EA9112C96DDD1|8|6EE477FE8558C37424 9E58CA61987F4F8860C-058784025B15B6953CBD0F400B|-7793543893895484849

Time for client to compute solution: 9 milliseconds.

Hash is:

DC7997595C8D925D4BCF5265790E4E3484E8F25B-B2C819F2A23A14A A6A47A600

Since above hash has "workfactor" (8) number of binary zero starting from its least significant bit, this request is permitted through to the protected resource. Note that the good client spent just 8 milliseconds solving this. A defending server would very well set the workfactor as 0.

Case 2: Suspicious or Bad Client, Workfactor 16

Puzzle sent by defending server:

1|https://www.example.com/login|E0A41B7B91D05240755C1BAF582BAE372E2F7A93EC50FF70F8CB5D5AB7D30490|16|F2871471782D754F4C C5A14E5F96C00AAC9EC-F25D1F569BE9AFBEDF1A0DBA2F6

Solution sent by client:

1|https://www.example.com/login|E0A41B7B91D05240755C1BAF582BAE372E2F7A93EC50FF70F8CB5D5AB7D30490|16|F2871471782D754F4C C5A14E5F96C00AAC9EC-F25D1F569BE9AFBEDF1A0DBA2F6|-36151208-88224289001

Time for client to compute solution: 424 milliseconds.

Hash is:

D9FFD842661C7F2BD59CB6FB53600DD560ED9B5-66F22709F2F545B2 C5FDE0000

Since above hash has "workfactor" (16) number of binary zero starting from its least significant bit, this request is permitted through to the protected resource. Note that the suspicious client spent about 420 milliseconds solving this, about 50 times more than the previous case, while the server was able to verify this with just a single hash check, exactly the same as the previous case.

Case 3: Suspicious or Bad Client, Workfactor 20

Puzzle sent by defending server:

1|https://www.example.com/login|71BC748F8CFE036B6381EB9797520B0452012189FA9CB6BAD5A09A21B10ECFEB|20|E613D3E2F76D84F504 979533867D6ACF7D6A218-D86DD6CBBF257E7095620CF68 solution sent by client:

1|https://www.example.com/login|71BC748F8CFE036B6381EB9797520B0452012189FA9CB6BAD5A09A21B10ECFEB|20|E613D3E2F76D84F504 979533867D6ACF7D6A2-18D86DD6CBBF257E7095620CF68|329849338371904797

Time for client to compute solution: 10217 milliseconds.

Hash is:

8ECAB962975EBFF926305811827179543640634A6-C1A02B139F8934E 7F0C0000

Since above hash has a "workfactor" of twenty (20), a number of binary zero (0xC0000) starting from its least significant bit, this request is permitted through to the protected resource. Note that the suspicious client now spent about 10 seconds solving this, about 20 times more than case 2, while the server was again able to verify this with just a single hash check.

In general the defending server can force the clients to back off for substantial amounts, minutes or days or even millions of years per current computing performance for SHA-256 and its associated mathematical complexity.

In this embodiment, the front end DDoS mitigating system therefore forces attackers or misbehaving clients to spend more resources to access to the protected resources (which encourages better behavior) or simply flood the incoming channel with traffic that exceeds its capacity ("dumb flood" traffic). The latter can be addressed by any of the current techniques or by simply extending the system so that more of the edge servers are checking the validity of the crypto-puzzles. Since the validity of the crypto-puzzle solution is a simple hash function any edge server can perform this validation. However, the validity of the crypto puzzle itself (enforced by the HMAC-SHA256 signature) in such an expanded, distributed environment becomes harder to check and enforce since sharing the symmetric HMAC-SHA256 key becomes unwieldy and less secure. The simple solution is to modify the signature function to instead use asymmetric keys so the public key can be freely distributed. For example, one could use ECDSA with the NIST published P-256 curve instead of HMAC-SHA256. While the usage of ECDSA instead of HMAC-SHA256 increases the verification server's load by a bit, the overall system still preserved the key feature where the defending server can asymmetrically and unilaterally force a client to expend exponentially increasing resources in order to encourage better client behavior.

III. Back-End Security

Back end security is handled by the Data Security Module (2). All data flowing in/out of the application is rerouted into the data security module (2) where the actual data encryption/decryption, data integrity checks, audit and logging functionality and key transport takes place. No unencrypted data or keys ever leave the application. Besides performing the security outside the database server and on the application server (16), another key innovation is that on the application server, the security functionality is seamlessly and transparently handled by the data security module (DSM) from under the ORM layer. This preserves the ORM API compatibility leading to a more productive, less expensive and seamless development experience. This effectively carves out logically trusted data stores within untrusted database server(s) (10).

For data destined for file servers (11), we similarly reroute the data from the file system module/interfaces (14) into the data security module (2). As before, the data security pipeline operates on the data. The reverse path is followed when data is fetched from the file server(s). As before, we again carve out logically trusted data stores within untrusted file server(s) (11).

For both the file server(s) and database server(s), we effectively use them as "dumb buckets of bits" with the data security built logically in the data security module (2). For both the file as well as database server(s), the data redirection needed to feed the data security module (2) takes place from existing layers (such as the ORM layer) either via wrapper functions or by hooking onto events generated from such existing layers as shown in the DSM modules and interface diagram of FIG. 3 (.NET Entity Framework example). The data security module (2) coordinated with the key management server(s) (8) transparently with few (if any) changes to existing ORM programming models. This makes it very simple for a programmer to begin using the described system without being overwhelmed by complexity or having to manually sort out individual details. The data security module (2) also generates appropriate events (for example: Key "Hospital A", version 45 retrieved for data decryption by a user in group "Nurses") during the course of its operations to create a security audit trail which can be analyzed by machine learning modules to alert operators of any security incidents. This audit functionality is shows in the Audit/Logging server(s) (9).

Figure 2A:
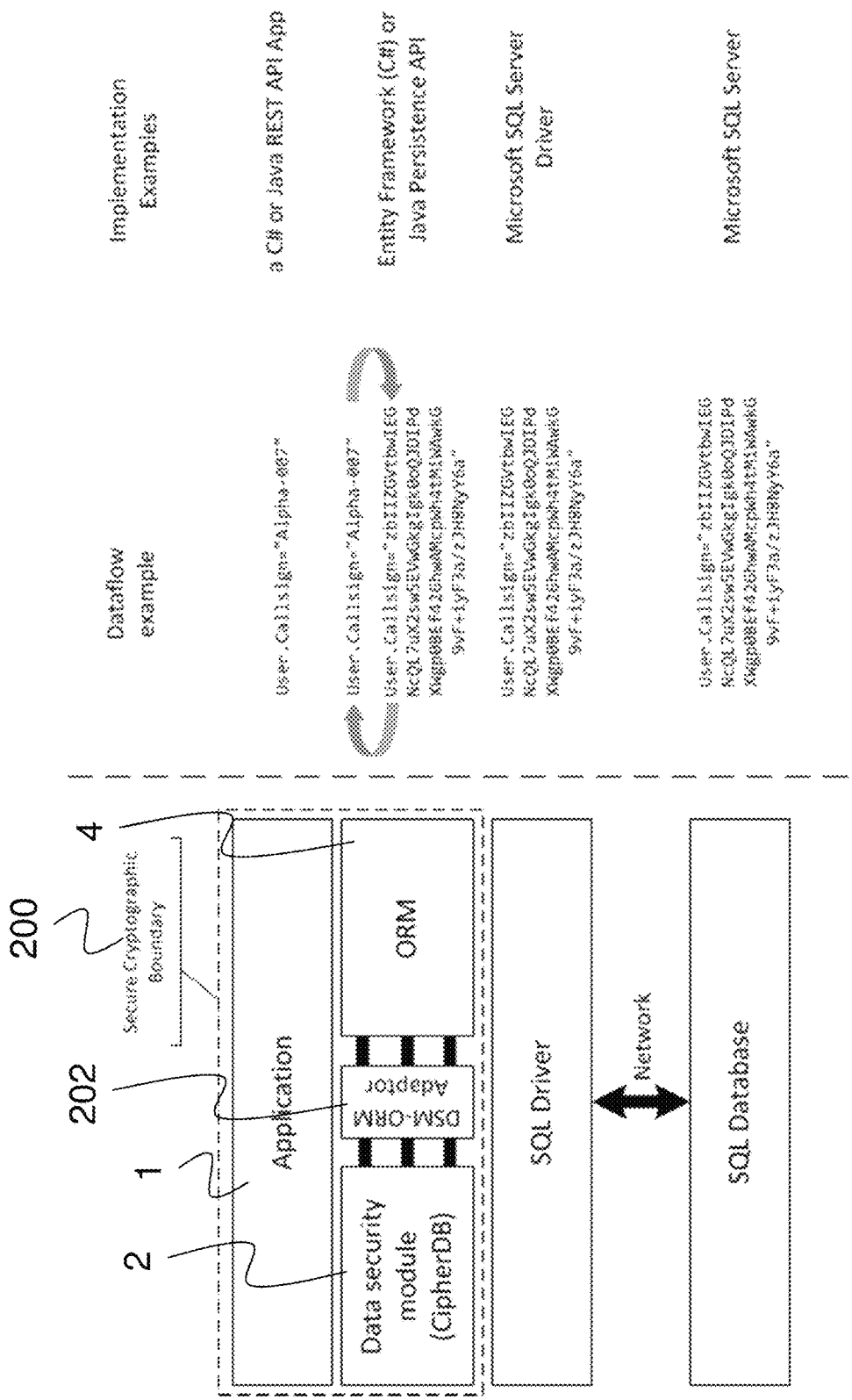
FIG. 2a is a block diagram illustrating the integration of objection-relational mapping (ORM) within the system framework, according to an embodiment of the invention.

FIG. 2a illustrates one embodiment of the integration of objection-relational mapping (ORM) within the system framework. All sensitive data is encrypted at the process boundary of the trusted application (1), shown as the secure cryptographic boundary (200) in FIG. 2a. Therefore, all sensitive data destined for the data-stores is secured even before it begins its journey. Our system is also modular by having a DSM-ORM adaptor (202) in between that allows for the main DSM module (2) to be reused across multiple ORMs with the ORM-specific logic only present in the DSM-ORM adaptors (202). The rerouting and manipulation of data as it flows through the ORM (4) is assisted by the ORM-DSM adaptor (202). Specifically, most ORMs have events, function pointers, hooks or other similar mechanisms at various points in the data-flow lifecycle, and our DSM-ORM adaptor (202) taps into those to reroute the data into the DSM for security processing. A non-exhaustive list of the sub-modules in the DSM's security processing chain includes data encryption, data decryption, tamper protection, data privacy, key management, key access pattern monitoring, generation of security alerts and security events, etc., as will be described in further detail below with regard to FIG. 3.

Figure 2B:
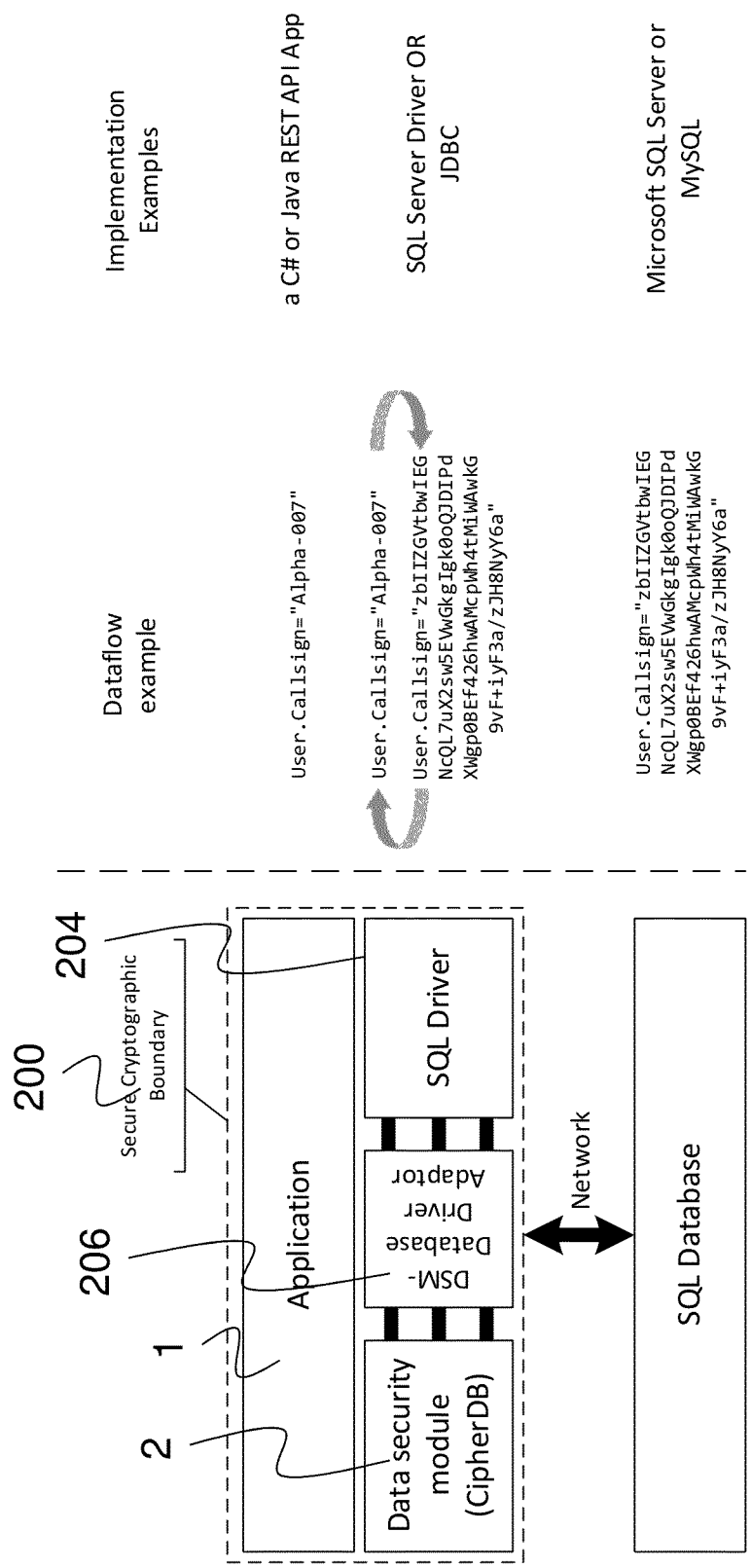
FIG. 2b is a block diagram illustrating an extension of a database driver to add a data security module (DSM) via a DSM-Database Driver Adaptor, according to an embodiment of the invention.
Figure 2C:
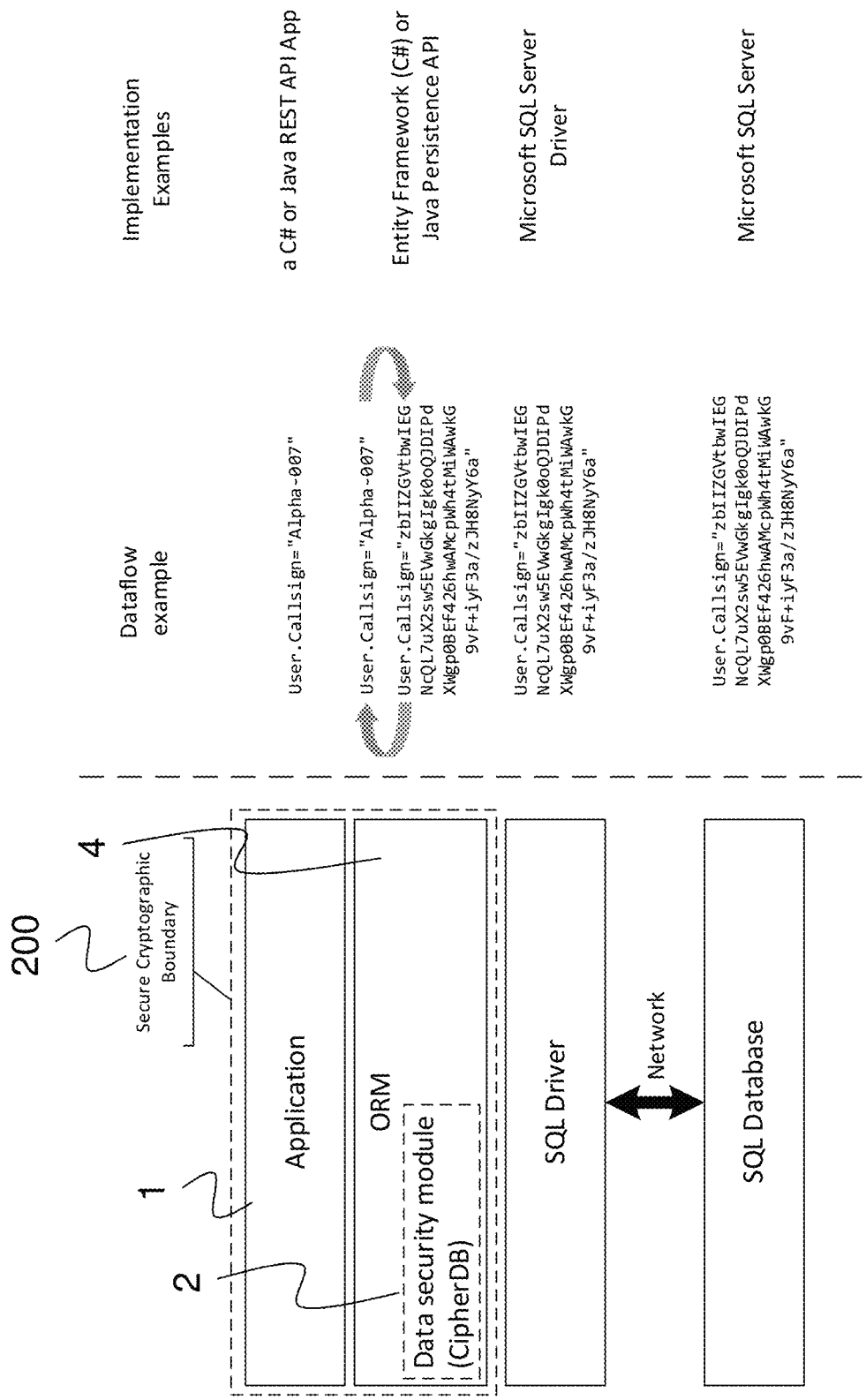
FIG. 2c is a block diagram illustrating the integration of the DSM into the ORM, according to an embodiment of the invention.
Figure 2D:
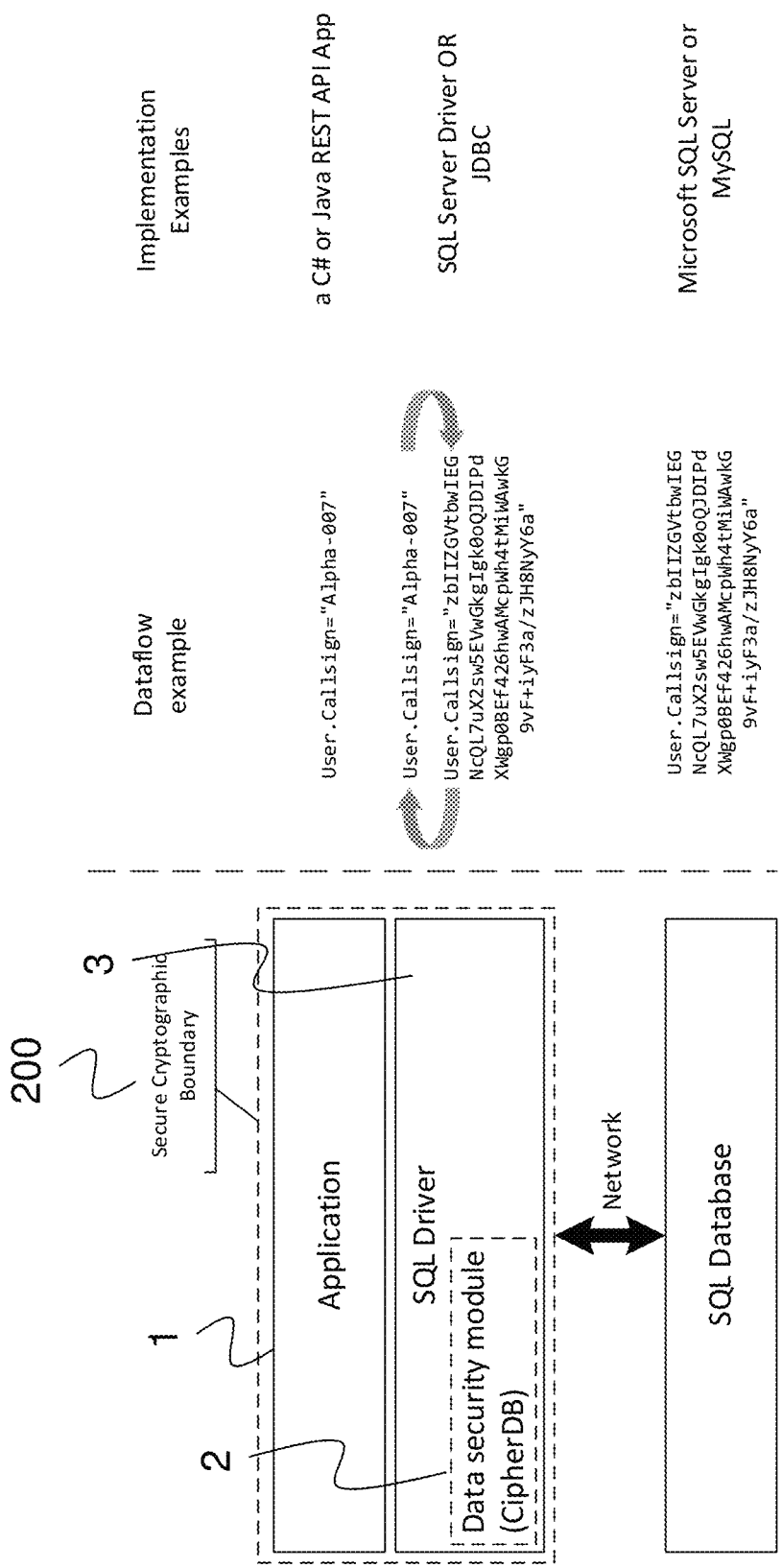
FIG. 2d is a block diagram illustrating the integration of the DSM into the database driver, according to an embodiment of the invention.

FIG. 2b illustrates an alternate embodiment showing the extension of a database driver (204) to add the DSM via a DSM-Database Drive Adaptor (206). FIG. 2c illustrates an additional embodiment where the DSM (2) is integrated into the ORM (4), while FIG. 2d illustrates a further embodiment where the DSM (2) is integrated into the database driver (3). The corresponding data flows and implementation examples are illustrated graphically alongside each configuration to show the differences in each configuration.

In one embodiment, data-stores in the system also never see the encryption keys themselves—a major security advantage. Even the generation and processing of Audit logs that are typically entrusted to the data-stores are handled within the system. This is possible because the DSM (2) orchestrates all key management requests and responses as the data flows through the ORM (4). Also, all such audit events can be routed to an external read-only data storage system for tamper resistance and isolation from the actual production data-stores. In other words, any compromise on the production data-stores doesn't impact the credibility of the audit system since the production data-stores are not trusted with that task. The invention can also include the creation of virtual-private data stores.

Figure 3:
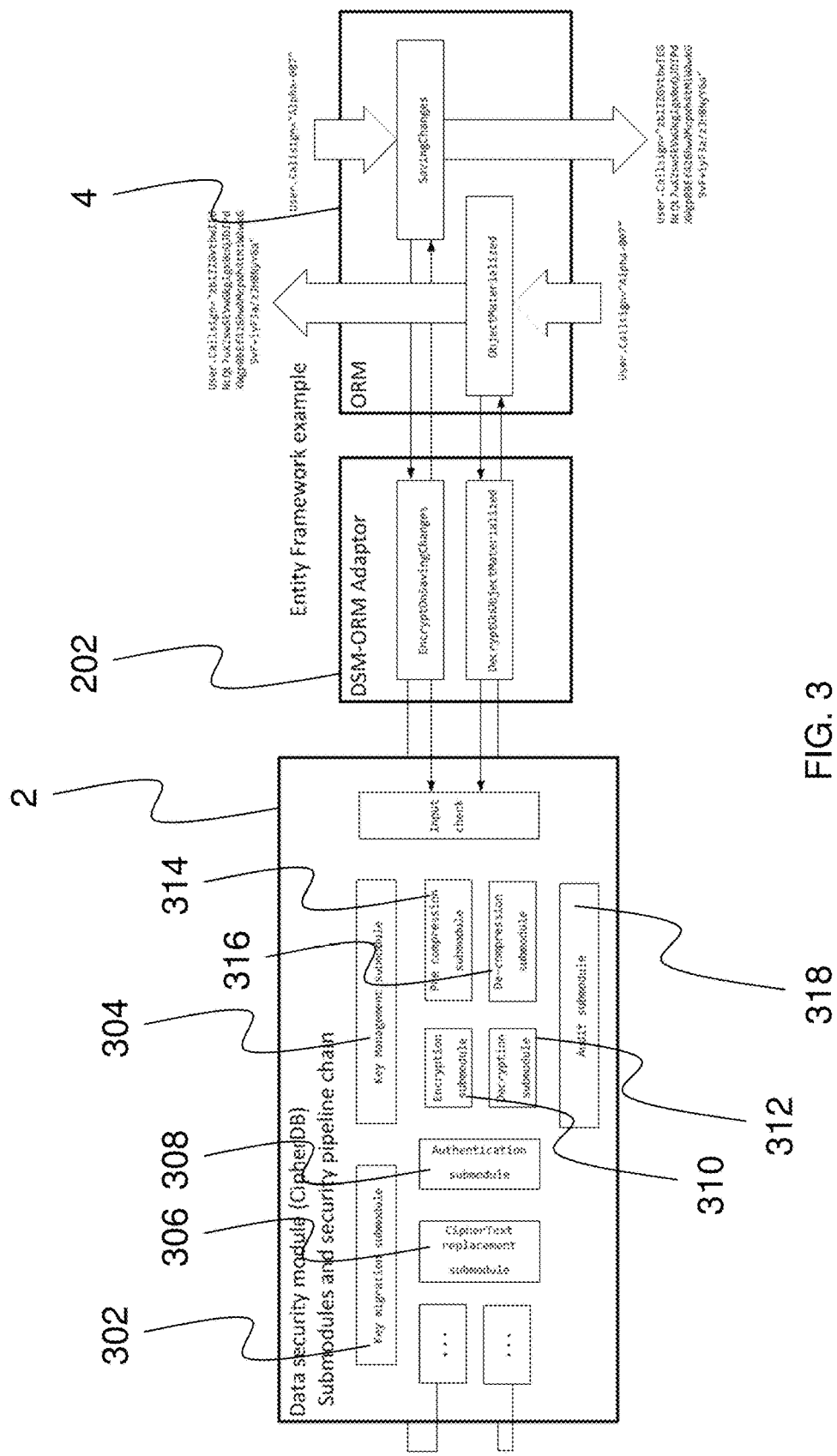
FIG. 3 is a block diagram illustrating submodules of a data security module of the system framework, according to an embodiment of the invention.

Another key innovation is that all the functionality is performed seamlessly within existing database ORM or data access layers to transparently and instantly upgrade the entire application without the need for extensive custom code or reengineering. Specifically, since application developers would have already programmed their application to talk to the ORM layers via the standard ORM application programming interface (API), adding this functionality behind that ORM API ensures that all data access calls across a given application are immediately under the purview of the DSM. This is shown in FIG. 3, which illustrates submodules of the DSM and their interface with the DSM-ORM adaptor and subsequently the ORM. In FIG. 3, the DSM includes a key migration submodule 302, key management submodule 304, ciphertext replacement submodule 306, authentication submodule 308, encryption submodule 310, decryption submodule 312, pre-compression submodule 314, de-compression submodule 316 and audit submodule 318. These DSM submodules and interface shows how the additional functionality comes into play despite presenting the same ORM interface to a developer.

Other solutions would require manual code reviews of every place in the entire application where the data access layer API is called, and have the developer manually address the security needs at every such API call. Therefore, this approach allows for the emergence of seamless, transparent and instantaneous application upgrades without extensive custom coding or reengineering.

In one embodiment, software is utilized to complete the requisite tasks. Data redirection can be handled by wrappers or events or callbacks, while cryptography can be handled by a standard cryptographic library. While we recommend any library that follows NSA Suite B ciphers, other libraries can also be used.

The application to be protected (1) is required. For front end security, the MFA client (12) and embedded MFA Server (5) are necessary. For back end data security the data security module is necessary (2). If using database servers for back end data security, the ORM layer (4), database driver (3) and database server(s) (10) are required. If using file server(s) for back end data security, the file system module (14) and file servers (11) are required. A user access network (6) is necessary. If using the DDoS protection innovation, the DDoS protection server(s) (15) are required.

External MFA server(s) (7) are optional as they can be replaced by embedded versions within the Data security module or be dropped if MFA isn't a requirement for a particular application.

External key management server(s) (8) are optional as they can be replaced by embedded versions within the Data security module. External audit/logging server(s) (9) are optional in that they can be embedded or be dropped altogether if audits and logging is not necessary for a particular application.

The use of existing load balancers, firewalls and intrusion-detection systems would improve the overall system at the front end. The use of dedicated cryptographic hardware accelerators would improve the back-end security performance. The use of secure hypervisors and a secure operating system would make the overall security better since the application is assumed to be trusted.

Any combination of the servers (7, 8, and 9) could be embedded inside the data security module (2). If using multiple application server(s) in a scale out manner, they do not need to be homogenous or co-located with each other.

The data redirection can happen either in the ORM layer or within the database driver layer.

The database server could be any form of SQL or NoSQL server(s).

If the invention is crafted as a library or in source code form, a person using the invention would add the invention (i.e. the software crafted) to their own software either in source code format or object code format. Example: Add the DLL of the invention to their own software project. The user also needs to configure the invention's operating parameters, per their liking. For the data security module, the user configures and uses existing file server or databases and the invention performs data security automatically by redirecting the data into the invention's data security module. If any of the modules are fashioned as standalone client or server programs, then to use the invention a user would simply invoke such a standalone program.

a. Key Management System

Another key innovation is that the ORM layer is designed to seamlessly work with an automated key management system with minimal to no changes to the programming model seen by the developers. The seamlessness emerges due to the fact that the key management is now automatically orchestrated by the DSM working behind the same ORM API. In other words, the ORM API surface seen by the developers in our system is identical or near-identical to a system without a DSM. Other solutions would require custom code or reengineering to handle the key management tasks separately. Our invention is also very versatile because it brings strong encryption and robust security to the application even when the ORM adapters, database drivers or file servers—or even when the underlying data-stores—are security-unaware or have weak security. Such versatility has tremendous commercial benefits.

The key management solution is scalable because every key follows a hierarchical naming structure which allows for distributed storage as well as retrieval. As an example of such an identifying convention, every key ID could be an IPv6 address and building upon RFC4193 one could even use the fc00::/7 range of IPv6 addresses for an autonomous key management cluster that can accommodate 256 (76 quadrillion) key management nodes, each of which can accommodate 264 (18 quintillion) keys. The end result is that when a request for a specific key enters a key management cluster, the request can be routed to and served by the specific key management node that is responsible for that specific key. For smaller systems, once can scale the above hierarchical system to a simple hierarchical notation, for example, something like X.Y where X and Y are integers. This secures the application that's sandwiched in between. By securing an application in this manner, its security is elevated even if this application is resident within the cloud or a datacenter over which the application owner has little control.

IV. Exemplary Methodology

Figure 4:
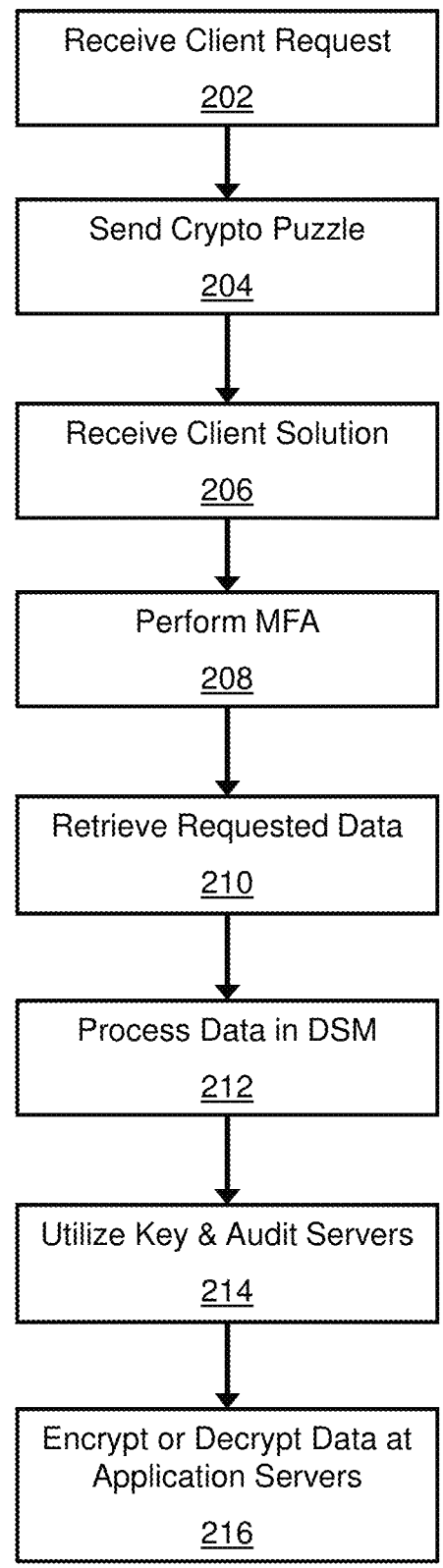
FIG. 4 is a block diagram illustrating a method of authenticating and securing data using the system framework.

FIG. 4 is a block diagram illustrating an example method of receiving a request from a client device at an application server. In a first step (202), a client request is received at the application server. The request is met with a cryptographic puzzle which is sent to the client to solve (step 204). Next, a client solution is received and verified (step 206). Multi-factor authentication is then performed on the user requesting access (step 208). If the crypto puzzle and MFA confirms the authenticity of the request and the user, the data requested is retrieved from a database or file server (step 210). The data is then processed at the data security module (step 212), while any key management requests or audit logs are handled separately in separate servers (step 214). The data is then encrypted or decrypted at the application servers (step 216).

The data would be encrypted when writing data to the virtual private data-store, and decrypted when reading data from the virtual private data-store. The application servers, as described above in FIGS. 2a-2d, may represent the various configurations including: inside the DSM, inside the DSM-ORM Adaptor, inside the ORM integrated with the DSM, and inside the database driver (for designs that would do this at a level below the ORM but still not on the database side.

V. Computer-Implemented Embodiment

Figure 5:
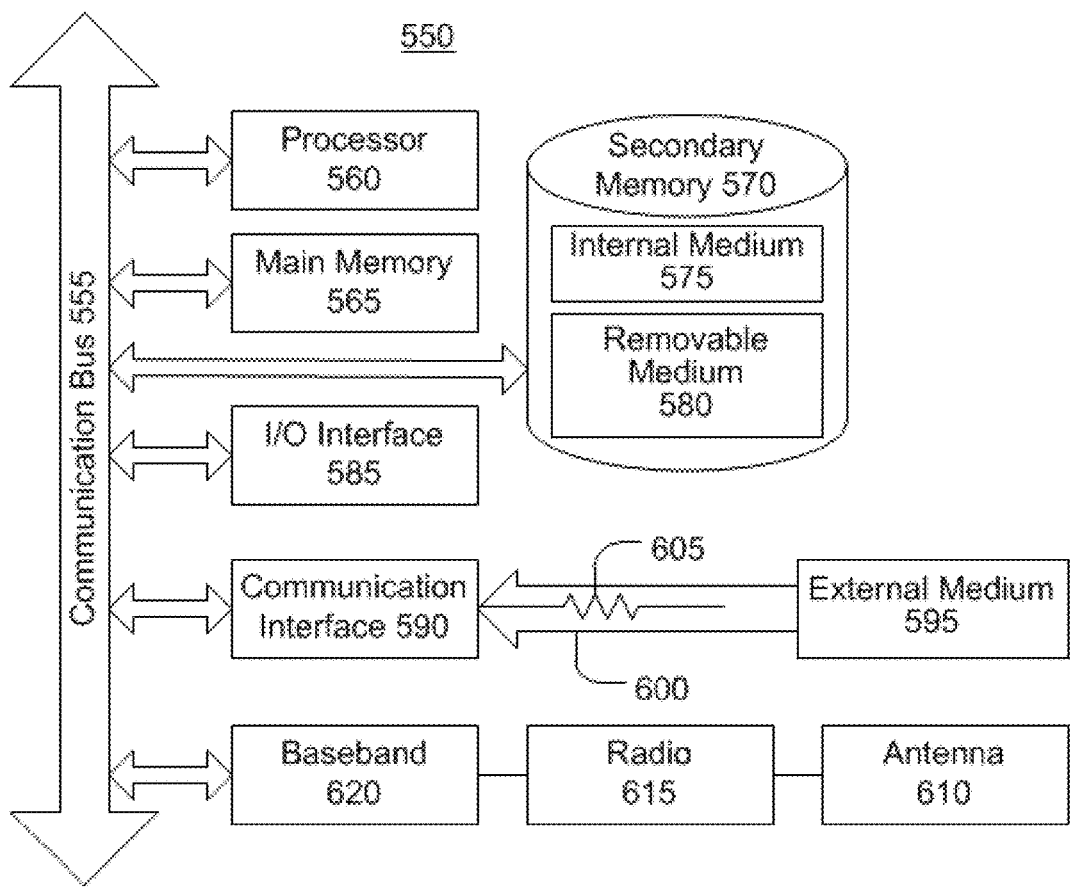
FIG. 5 is a block diagram illustrating an example wired or wireless processor enabled device that may be used in connection with various embodiments described herein.

FIG. 5 is a block diagram illustrating an example wired or wireless system 550 that may be used in connection with various embodiments described herein. For example the system 550 may be used as or in conjunction with a [describe the devices shown in earlier figures] as previously described with respect to FIGS. [list figure numbers that show the devices]. The system 550 can be a conventional personal computer, computer server, personal digital assistant, smart phone, tablet computer, or any other processor enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

System 550 preferably includes a main memory 565 and may also include a secondary memory 570. The main memory 565 provides storage of instructions and data for programs executing on the processor 560. The main memory 565 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include a internal memory 575 and/or a removable medium 580, for example a floppy disk drive, a magnetic tape drive, a compact disc ("CD") drive, a digital versatile disc ("DVD") drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 570. Examples of external storage medium 595 may include an external hard disk drive or an external optical drive, or and external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage media 580 and communication interface 590, which allow software and data to be transferred from an external medium 595 to the system 550.

System 550 may also include an input/output ("I/O") interface 585. The I/O interface 585 facilitates input from and output to external devices. For example the I/O interface 585 may receive input from a keyboard or mouse and may provide output to a display. The I/O interface 585 is capable of facilitating input from and output to various alternative types of human interface and machine interface devices alike.

System 550 may also include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a modem, a network interface card ("NIC"), a wireless data card, a communications port, a PCMCIA slot and card, an infrared interface, and an IEEE 1394 fire-wire, just to name a few.

Communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

The system 550 also includes optional wireless communication components that facilitate wireless communication over a voice and over a data network. The wireless communication components comprise an antenna system 610, a radio system 615 and a baseband system 620. In the system 550, radio frequency ("RF") signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown) that are executable by processor 560.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A technical system for securing application data, the system comprising:
an application server associated with a virtual private data-store for application data, the application server comprising:
a data security module (DSM);
a data security module adaptor;
one or more hardware processors operatively coupled to the DSM and the virtual private data-store, wherein the one or more hardware processors are configured to:

monitor data between an application and the virtual private data-store via an objection relational mapping (ORM) layer;

detect, based on at least a key flag, whether the monitored data at the ORM layer comprises sensitive data;

determine, via the DSM, whether a key entry is associated with the detected sensitive data;

in response to the determination, the DSM processes the sensitive data to secure the data, wherein the data security module adaptor maps the monitored data flowing from the DSM to the ORM;

wherein the DSM operating at the ORM layer detects whether the monitored data at the ORM layer comprises encrypted sensitive data; and wherein the DSM orchestrates key management requests and responses at the ORM layer.

2. The system of claim 1, further comprising a distributed denial of service (DDoS) protection server sending cryptographic puzzles to requesting clients, wherein the DDoS protection server sends cryptographic puzzles based on a request type.

3. The system of claim 1, further comprising a multifactor authentication (MFA) server performing a plurality of user and client authentications, wherein a client is bound to the MFA server using a unique seed; and wherein the client authentications comprises a one-time password based on the unique seed.

4. The system of claim 3, wherein the plurality of user and client authentications is based on at least one of location, time, gestures, or biometrics.

5. The system of claim 2, wherein a complexity factor of the cryptographic puzzles increases based on the type of request from the client.

6. The system of claim 2, wherein the cryptographic puzzles are encoded in a message header.

7. The system of claim 1, wherein the data security module adaptor routes and maps data flowing from the DSM to a key management node in view of a key identifier.

8. The system of claim 1 wherein, the a data security module adaptor includes at least one of a module-objection relational mapping (DSM-ORM) adaptor or a data security module database driver adaptor.

9. The system of claim 1, wherein to detect whether the monitored data at the ORM layer comprises sensitive data is based on at least one of pattern analysis, auditing, and a key flag.

10. A non-transitory computer-readable medium comprising instructions, where one or more processors are programmed to perform steps comprising:

monitoring data via a data security module (DSM) from an objection relational mapping (ORM) layer for a client requesting access to an application;

routing requested data from the client through a data security module (DSM), wherein the DSM operating at the ORM layer detects whether the monitored data at the ORM layer comprises sensitive data, determining, via the DSM, whether a key entry is associated with the detected sensitive data, and in response to the determining, the DSM processes the requested data at the ORM layer to perform encryption services via a data security module adaptor on an application server;

wherein the DSM operating at the ORM layer detects whether the monitored data at the ORM layer comprises encrypted sensitive data;

wherein to detect whether the monitored data at the ORM layer comprises sensitive data is based on at least a key flag; and wherein the DSM orchestrates key management requests and responses at the ORM layer.

11. The non-transitory computer-readable medium of claim 10, further to perform steps comprising performing a plurality of multifactor authentication (MFA) tests on a user and client requesting access to an application wherein the plurality of MFA tests comprise shuffling of authorization factors.

12. The non-transitory computer-readable medium of claim 10, further to perform steps comprising performing a cryptographic puzzle test on the user, wherein a complexity factor of the cryptographic puzzle test increases based on a type of request.

13. The non-transitory computer-readable medium of claim 10, wherein routing the requested data is based on a key identifier.

14. The non-transitory computer-readable medium of claim 10, wherein the a data security module adaptor includes at least one of a module-objection relational mapping (DSM-ORM) adaptor or a data security module database driver adaptor.

15. The non-transitory computer-readable medium of claim 10, wherein detecting whether the monitored data at the ORM layer comprises sensitive data is based on at least one of pattern analysis, auditing, and a key flag.

* * * * *